Sept. 19, 1939.  S. J. STANTON  2,173,770
BUS
Filed Dec. 28, 1936  9 Sheets-Sheet 2

Inventor:
S. J. Stanton

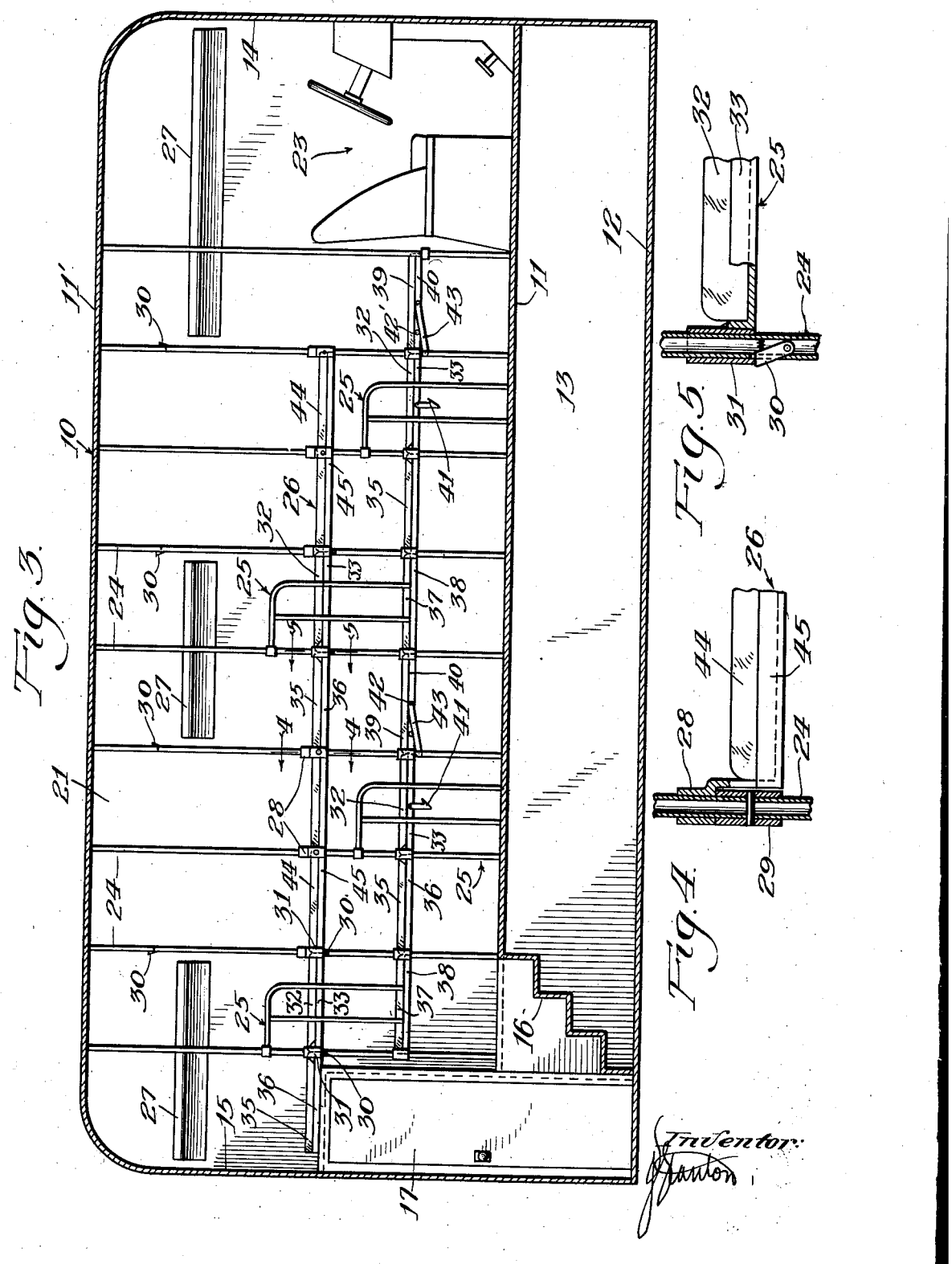

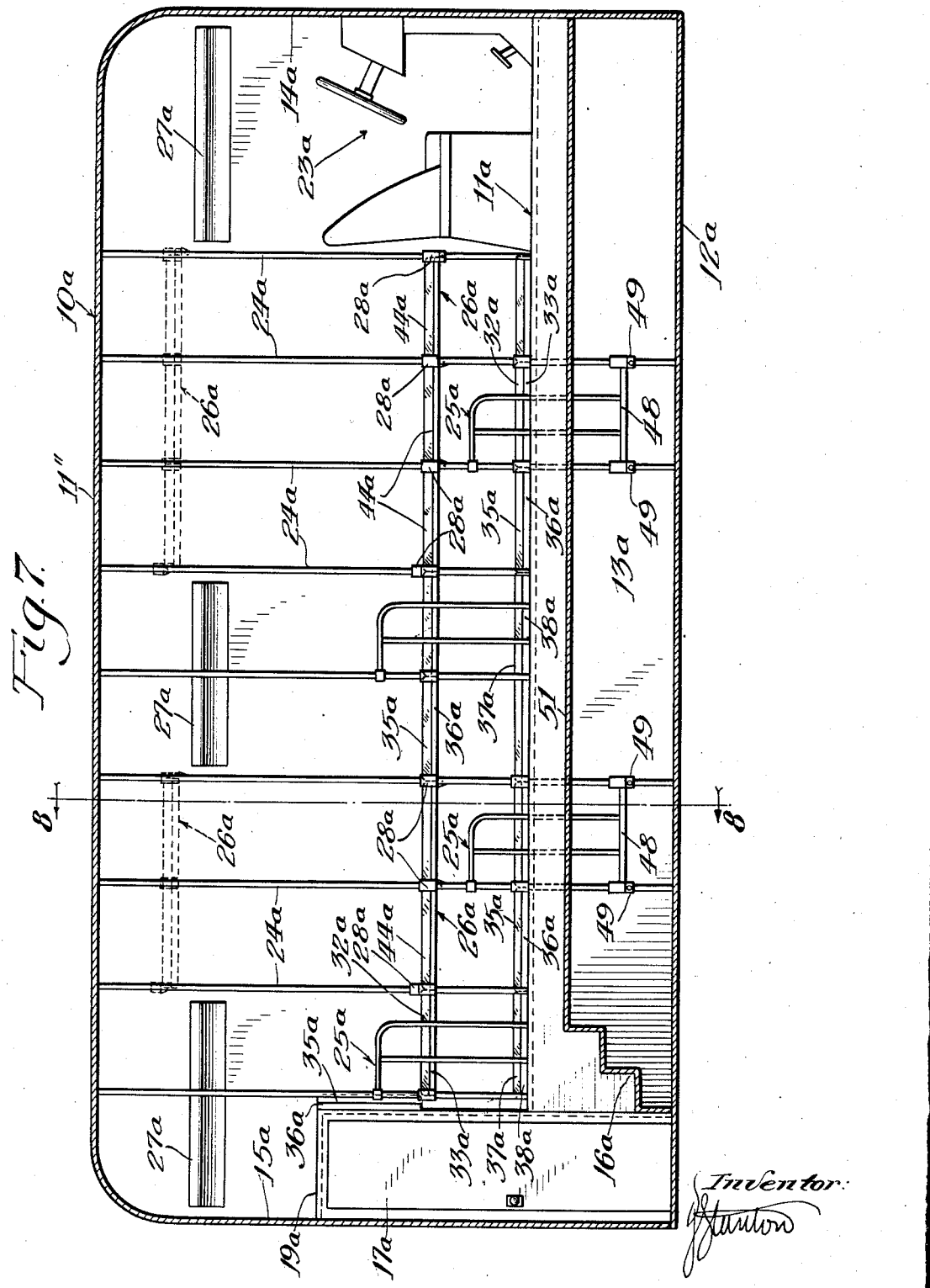

Sept. 19, 1939. S. J. STANTON 2,173,770
BUS
Filed Dec. 28, 1936  9 Sheets-Sheet 5
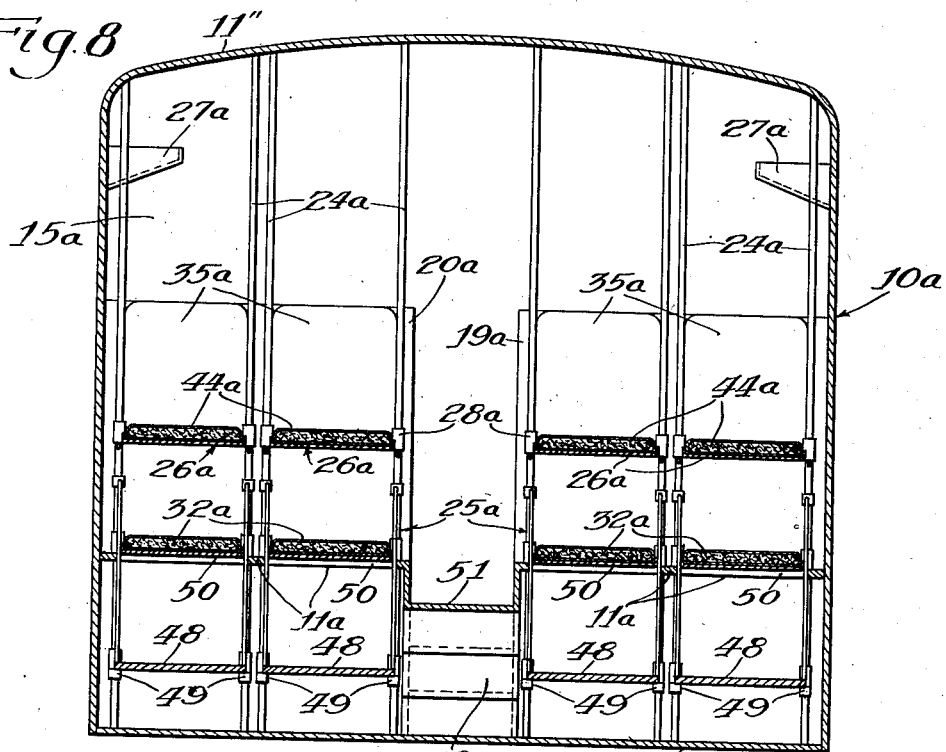
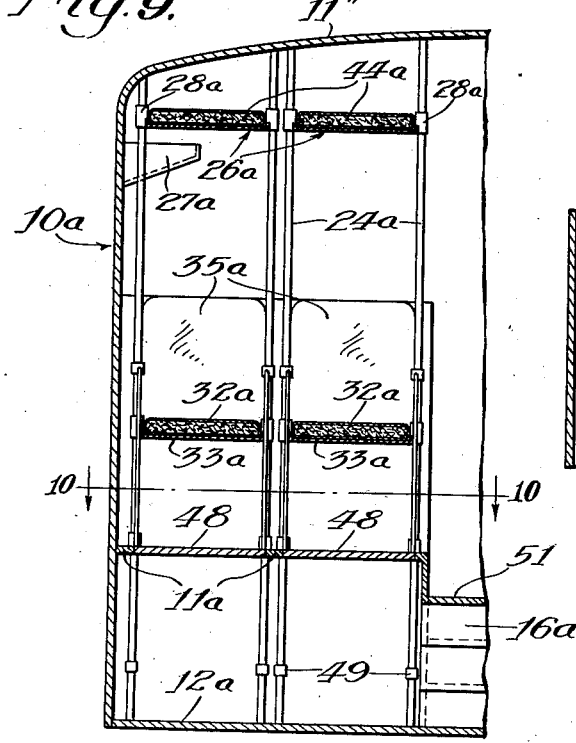
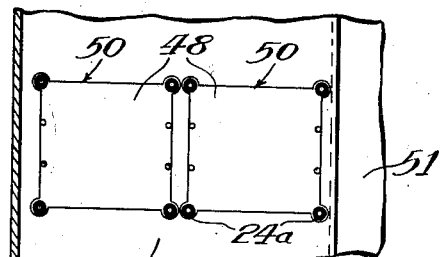

Sept. 19, 1939.　　　　S. J. STANTON　　　　2,173,770
BUS
Filed Dec. 28, 1936　　9 Sheets-Sheet 6
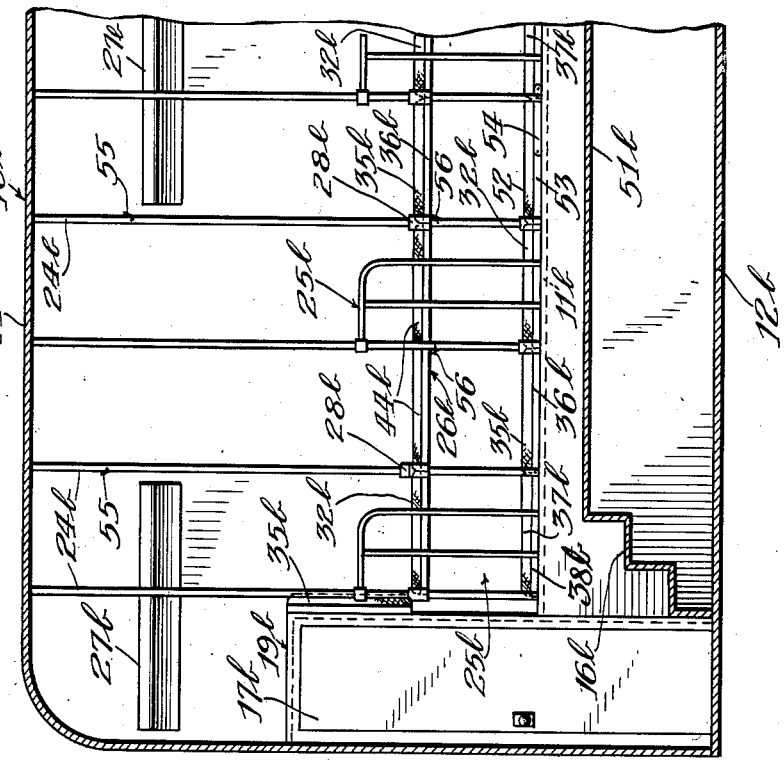
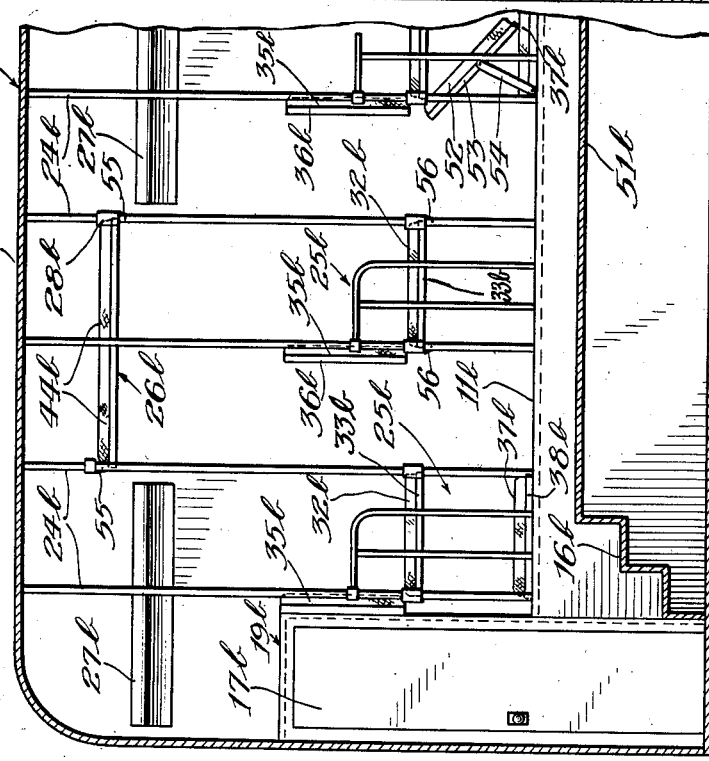

Sept. 19, 1939.  S. J. STANTON  2,173,770
BUS
Filed Dec. 28, 1936  9 Sheets-Sheet 7
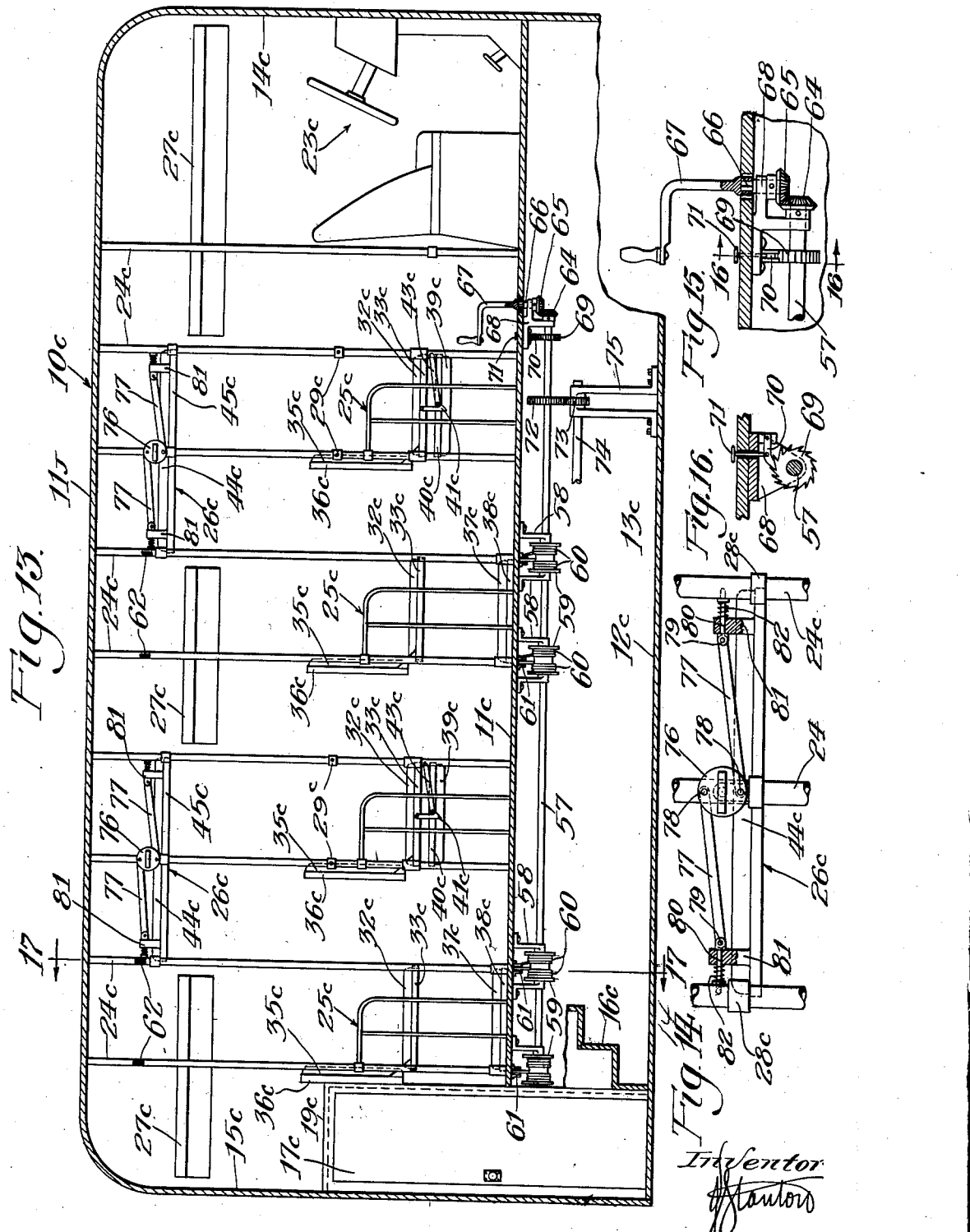

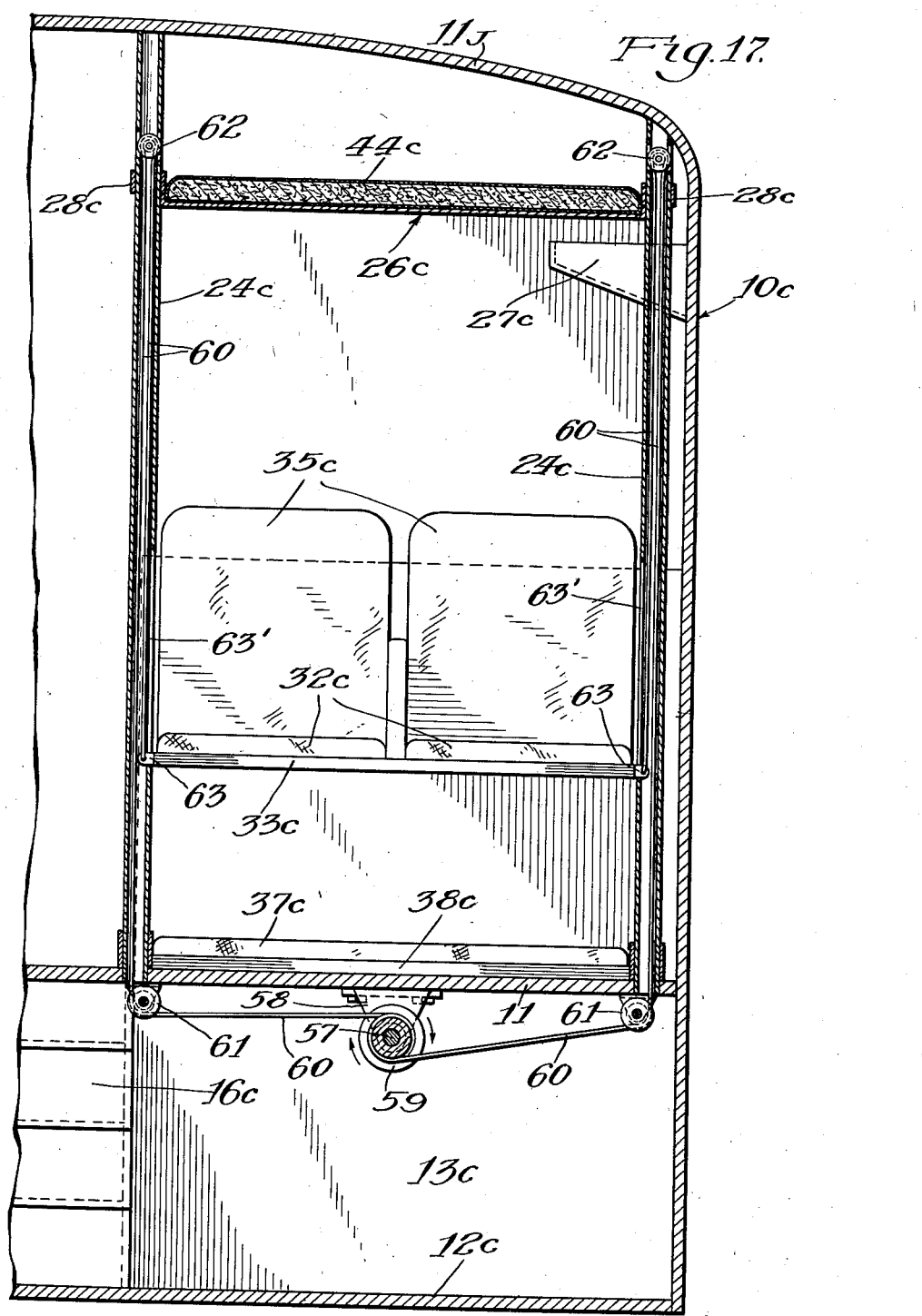

Sept. 19, 1939.　　　　　S. J. STANTON　　　　　2,173,770
BUS
Filed Dec. 28, 1936　　　9 Sheets-Sheet 9
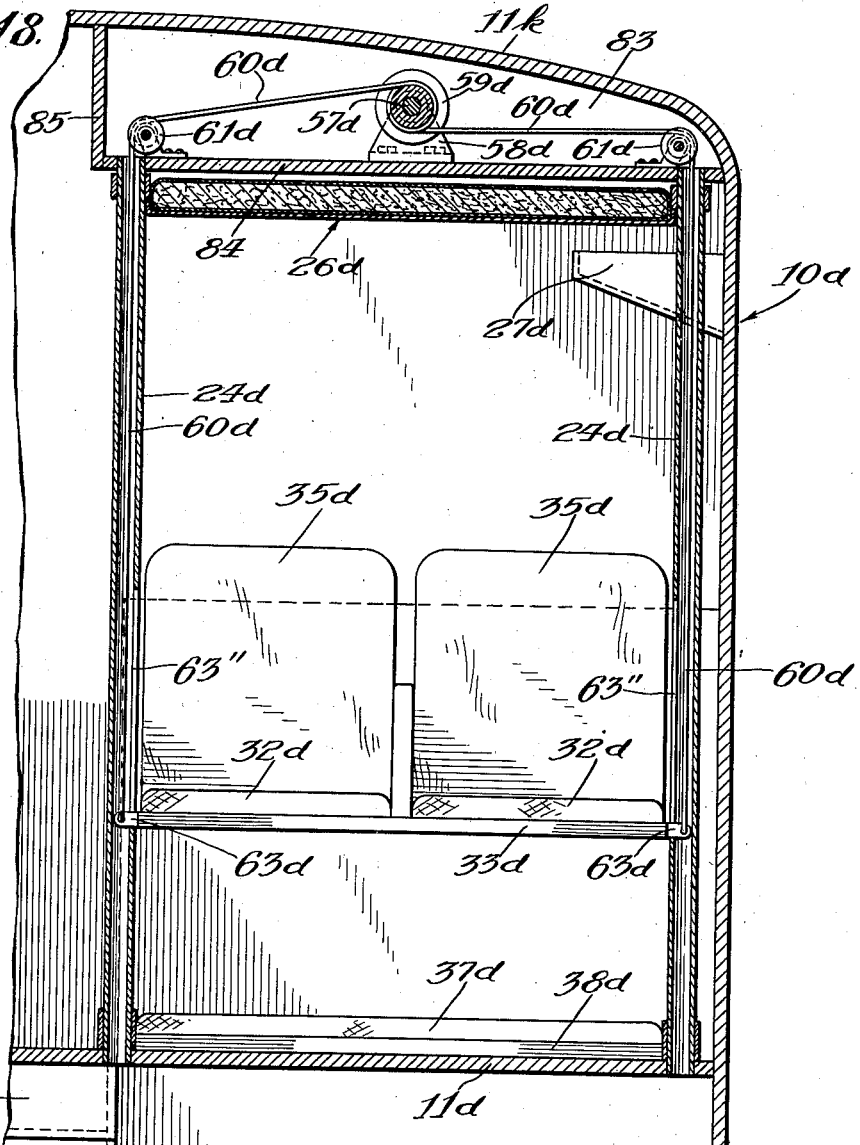
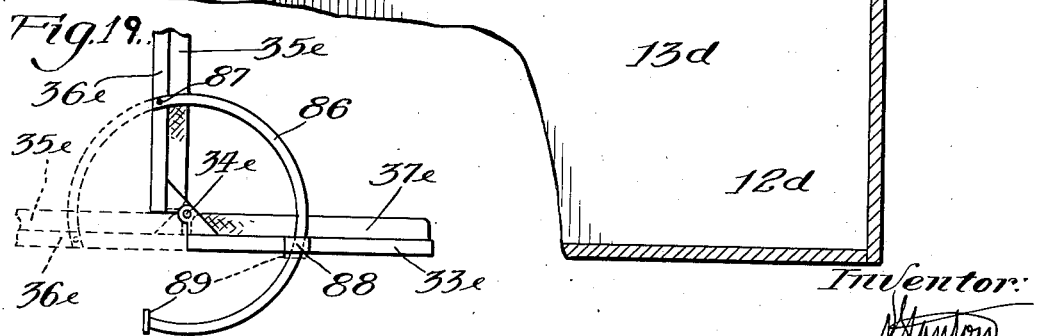

Patented Sept. 19, 1939

2,173,770

UNITED STATES PATENT OFFICE 2,173,770

BUS

Samuel John Stanton, Chicago, Ill.

Application December 28, 1936, Serial No. 117,687

10 Claims. (Cl. 296—64)

The vehicle disclosed herein is introduced to the passenger transport world as a carrier possessing the virtues so keenly desired by the expanding transport enterprises—comfortable night sleeping accommodations equal to the full day time seating capacity, with the resulting possible advantage of superior bus service at no increase in rates for transportation.

The general mechanical characteristics making such extended accommodations possible is an available combination, as a part of the vehicle, of articulate chairs with other auxiliary elements for the formation of more than one tier of berths within the vehicle. The chairs when incorporated in the combination fit in, distended, as platform elements in a berth tier. When not a part of the combination they stand as passenger seats on the passenger floor of the vehicle. The auxiliary elements, when not in the combination, rest unobtrusively in out-of-the-way places within the vehicle.

One expedient made available for the combination, thus combinable and distributive for double service, is the novelty of separating the chairs by mechanical devices into two or more levels. The mechanical movements of the elements are facilitated by a unique hoisting system, which may be concealed between walls and within tubular posts, in its major parts, to function with no danger of injury to any person within the vehicle.

With all that, this combination is adaptable to a variety of conditions. It can be constituted to devolve into two tiers of berths within a space as close as 24 inches from the floor—it does not have to be confined to such low levels, but it can be. A compact facility of this kind is especially desirable for such vehicles as the present lower buses, airplanes and buses with an upper and a lower deck, in each case the facility providing a full length berth for each seat passenger within the vehicle, no matter how small or how large the vehicle may be.

The chairs may be contrived so that they may be made to articulate from one position to another, individually or in groups, with power for the articulation to be applied by hand or mechanically. Mechanical power may be drawn from the vehicle motor, batteries or the like, while the lifting expedients may or may not include hydraulic devices, which variation, not shown in the drawings, fits in readily with the general scheme herein presented.

In the drawings:
Fig. 1 is a longitudinal cross section of a vehicle. More definitely it may be described as the longitudinal cross section of a bus.

Fig. 3 is a longitudinal section, similar to Fig. 1, showing one set of the passenger chairs, raised to a higher level—chair backs turned to a horizontal position.

Fig. 4 is a fragmentary section taken on the line 4—4 of Fig. 3.

Fig. 5 is a fragmentary section taken on the line 5—5 of Fig. 3.

Figure 1:
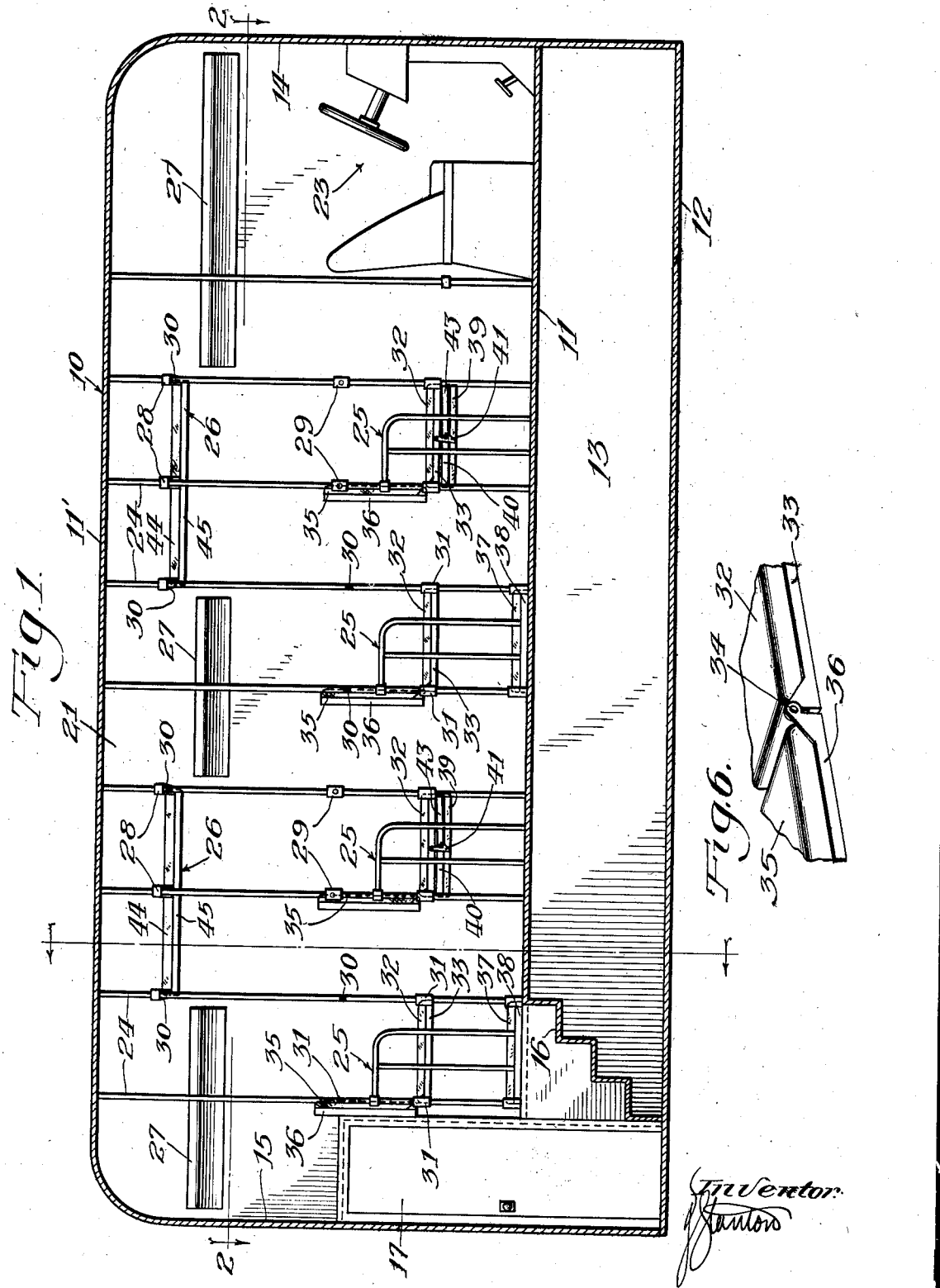

Fig. 6 on sheet 1, is a fragmentary perspective view showing the seat and back of the chair hinged at 34.

Fig. 7 is a longitudinal cross section of another form of my invention.

Fig. 8 is a vertical cross section taken on the line 8—8 of Fig. 7.

Fig. 9 is a section similar to Fig. 8, but with berth elements in a changed position.

Fig. 10 is a fragmentary plan section taken on line 10—10 of Fig. 9.

Fig. 11 is a broken longitudinal cross section of another modified form of my invention.

Fig. 12 is a view similar to that of Fig. 11, but with berth elements in a changed position.

Fig. 13 is a longitudinal section of another modified form of my invention showing mechanical means for raising and lowering parts of the berths.

Fig. 14 is an enlarged fragmentary view of mechanism shown in Fig. 13.

Fig. 15 is an enlarged fragmentary view of mechanism shown in Fig. 13.

Fig. 16 is a cross section taken on the line 16—16 of Fig. 15.

Fig. 17 is a cross section—enlarged—taken on the line 17—17 of Fig. 13.

Fig. 18 is a cross section similar to Fig. 17, but somewhat modified.

Fig. 19 is a fragmentary view showing a modified form of seat and back construction.

The construction of buses as usually followed in the current art, is taken as the practice for the present bus. Only the main features will be detailed out in the present specification.

Referring to the drawings in greater detail: The numeral 10 indicates a typical vehicle as a whole. The floor therein on which the passenger chairs 25 are located is indicated by 11. The numeral 12 indicates a sub-floor, which is the bottom wall of the said vehicle. This sub-floor is spacially related to interior floor 11 by a compartment 13, floor 11 being an intermediary wall. Numeral 11' indicates the top wall of the vehicle, that is, the roof. Top wall 11' and bottom wall 12 as well as intermediary wall 11 are embraced by the end walls 14 and 15 as well as by the side walls 21 and 22.

The chairs 25 in the typical vehicle are arranged in line facing forward, and they are disclosed herein in pairs on each side of a central aisle 51. The aisle, in the preferred arrangement, terminates in a set of steps 16, leading to compartments 19 and 20, immediately back of the last pair of chairs, which compartments are accessible through doors 17 and 18 respectively.

This vehicle embodies a control mechanism and driver's quarters as indicated by numeral 23. The chairs 25 are in contact with posts 24, which serve as guides or traction for articulating berth elements—platforms 26 and chair seats 32—33 are articulated or upwardly and downwardly sliding berth elements.

Describing the combination further, each berth element is a rectangle, designed in the present illustrations, to be substantially 18 x 18 inches, or a multiple thereof. A chair is made up of two elements, a seat 32—33, and a back 35—36, each element being substantially 18 x 18 inches, each element indicated by two numbers, one referring to the frame, the other to the cushion or upholstering supported by the frame. The traction—that is guide posts—are correspondingly 18 inches apart.

Figure 2:
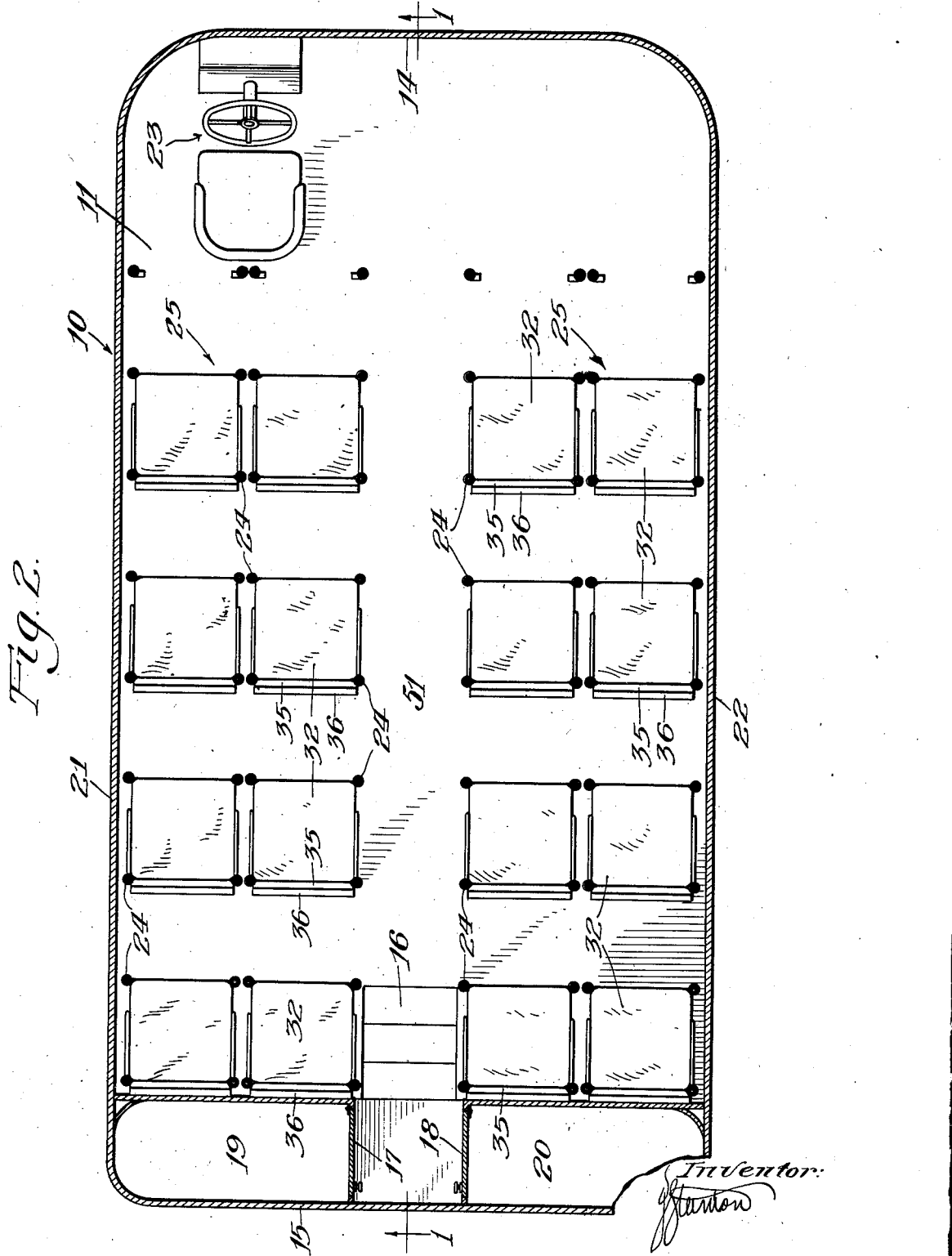
Fig. 2 is a plan section taken on the line 2—2 of Fig. 1.

The chairs separated from each other into different levels usually are not chairs adjacent but chairs in alternate positions to each other on the floor, considering the positions of the chairs from end to end in the bus. See Fig. 1 and Fig. 3. Fig. 1 suggests a bus with rows of chairs standing on the floor to one side of the center aisle. Fig. 3 shows one set of the chairs in their original positions on the floor, while another set of them is suspended in a raised level. The positions of the rows of chairs on the floor may be seen on the floor plan outlined in Fig. 2. Fig. 1 may be considered as a longitudinal cross section taken on line 1—1 of Fig. 2.

Somewhere near each chair 25 is an auxiliary element or two of indispensable purpose. In Fig. 1 the auxiliary elements are revealed as platforms 26 stored near the ceiling and as platforms 37—38, and 39—40, concealed at the bottom or under some of the chairs. These two types 26 and 37—38 slide on the guide posts, or rails, 24. Note the position of platforms 37—38 when the chairs are raised to a higher level as shown in Fig. 3. They move with the chairs to which they are attached, and in the elevated positions in this particular arrangement attain the same level as that of the seats 32—33 in the chairs standing in the lower level. Note the back of each chair 35—36. This type of back comprising a cushion 35 with its supporting frame 36 as shown in Fig. 3 is hinged. When this back is turned back as far as its mechanism will permit, as shown in Fig. 3 it lies horizontally on a level with the chair seat 32—33 in front of it and the auxiliary platform 37—38 in back of it. The seats and auxiliaries of course may be of any size determined.

Referring again to Fig. 3. The first row of chairs, viewing the interior from back to front, is in the higher level. The second row of chairs is in the lower level. The third row of chairs is in the same level as the first, and the fourth on the same level as the second, and so on—odd numbered chairs up, even numbered chairs on the floor. Back 35—36 of each chair in Fig. 3 turned back in a horizontal position, is on a level with the chair seat 32—33 in front of it. The backs of the chairs in row 1 rest on top of the compartment 19, Fig. 2, indicated in Fig. 3 by door 17.

Platforms 26 in Fig. 3 appear lowered toward the distended chairs, shown on a level with the chair seats 32—33 in the upper level—platform cushion 44 in its lowered position a level with chair cushion 32 in its elevated position.

All the rectangles, made accurately to measurements, contact each other substantially when assembled in their berth tier positions. The continuous series when the elements are in position for service is divisible into berth sections, substantially 72 x 18 inches—in accordance with the scale followed in the present illustrations which are set out only with intent of suggestion and not as determined finalities—72 x 18 inches being an ample sleeping surface for the average person.

The chairs in the lower level Fig. 3 are shown standing unmoved from the floor. The chair back elements 35—36 are turned to lie horizontally on a level with the chair seats 32—33 in front of them, and in a horizontal position with the platforms 37—38 behind them.

Numerals 39—40 indicate auxiliary platforms. When in neutral position these platforms are carried under the chairs as shown in Fig. 1, and for service are swung out on the pivotally mounted arms 43 to a level horizontally with chair seats 32—33, as shown in Fig. 3.

This array of rectangular elements for the lower tier contacting each other in accordance with the mechanical principles revealed in the disclosures for the upper tier comprise a level divisible into berth sections, like the sections above, of 72 x 18 inches, being similarly ample sleeping surfaces for average persons. Each berth element, upholstered or cushioned, makes every combination of elements fairly comfortable as a berth even without bedding perquisites—more available and fully more constituted for resting than the tilting chair in the commonly used bus or train coach.

While the foregoing discloses a compact arrangement for a two tier combination in the usual height bus—involving the plan of a berth for each chair passenger—the following shows a combination for disposition of the elements for berths in two tiers within still closer limitations.

Fig. 7 shows the seats in the odd numbered rows, viewing them back to front as before, remaining unmoved on the floor, while the seats in the even numbered rows lowered into the space between the bottom 12a of the bus (see 12 in Fig. 1) and the intermediary floors 11a (see 11 in Fig. 1). The principle of combining the chair seats with auxiliaries to form berths is the same as in the preceding illustrations. In each case the berths being composed of four sections, 18" x 18" each or equivalents, afford a sleeping area of 18" x 72". Note platforms 46. These in neutral positions are a part of the intermediary floor 11a, in the form of a trap door, rigidly attached to the chairs which surmount them. When the berths are to be made up, these slide down into the empty space under the floor 11a, carrying chair 25a to a level where the chair-seats 35a—36a of the lower chairs level up with the intermediary floor 11a.

The platform 26a, in this instance, is lowered from under its ceiling neutral position to contact with 32a—33a on one end and 35a—36a on the other end of it. Platform 26a in the front part of this model, right behind the driver's seat, occupies three spaces between the guide posts, forming by itself a full length berth base of 72 x 18 inches when in the service level. The principle of contacts and berth division here is the same as in the preceding disclosures.

Figures 11 and 12 show a variation of the preceding device. Here the even numbered chairs do not, continuing the preceding numbering, slide down below the intermediary floor 11b. There are no trap doors in this type of bus. Here only the seats 32b—33b of the even numbered rows slide down on the guide posts 24b. The chair arms of the chairs 25b remain fixed as in the neutral positions. The chair seats 32b—33b carry with them the chair backs 35b—36b, which are turned back to rest horizontally on the floor, auxiliary elements 37b—38b being similar to 37—38 in Fig. 1. Cushioned platforms 52—53 hidden under adjacent chairs are swung out on their pivoted arms 54 to lie on a level with the other elements comprising the lower berths. The four typical elements 37b—38b plus 35b—36b plus 32b—33b plus 52—53 form a berth, according to the scale here used, of 72 x 18 inches in the level immediately over the intermediary bus floor, 11b. Similarly the berths in the next level—next above—are formed by the typical elements 32b—33b plus 26b plus 35b—36b. In this case 26b being 32" x 18", corresponding to platform 26 or 44—45 in Fig. 1. These combinations, with a series of berths on or near the floor, are provided in such low roofed vehicles as double decked buses or buses routed to pass under low bridges, or for such mediums as the smaller aeroplanes where high ceilings cannot be attained.

The articulating elements in the present invention are impelled in their movements by a unique combination which may briefly be referred to as the vehicle hoisting apparatus. The major element of this combination is a shaft which revolves when in operation. In this particular disclosure this shaft 57 is power driven and is suspended in the compartment 13. It is associated with a set of windlasses 59 attached to the floor 11 by brackets 58. Included in this hoisting apparatus are a set of cables 60 which wind and unwind over windlasses 59, the free ends of these cables being attached to the articulating elements, like at lug 63 in Fig. 17.

The guide posts 24 are tubular or hollow. The cables inside the vehicle operate through the post tubes and are facilitated in their operations by pulleys, 61 and 62, over which these cables slide.

Numeral 74 points to a power shaft—only partially disclosed—concealed in compartment 13, which hooks on to the vehicle motor, not shown in the illustrations. A pinion gear 73 mounted on said shaft 74 operates cooperatively with a spur gear 72 mounted on shaft 57. This combination of gears 72 and 73 with shafts 57 and 74 incorporated into the vehicle to transmit power from the vehicle motor to the shaft 57 motivates the hoisting apparatus in its operations.

One of the unique features to be noted is the ease with which the berths are made up and unmade in this vehicle. The berth elements—at least the main elements—are incorporated in the hoisting apparatus. The hoisting apparatus is under control from the driver's quarters 23—that is the driver can connect shaft 74 to or disconnect it from the vehicle motor by means of a lever, not shown in the drawings, within his reach. By causing the rotation of shaft 57 in one direction he can impel the hoisting system to pull the berth elements from their day position within chairs standing on the floor and as platforms disposed near the ceiling with mechanical ease into sleeping levels, as indicated in Fig. 3 and Fig. 7. By rotating shaft 57 in the opposite direction he can impel the hoisting system to pull the berth elements out of the sleeping levels into their positions as shown in Fig. 1.

This functional cooperation of the novel berth elements with the novel hoisting apparatus makes the compact and convertible arrangements possible whereby the transport enterprises can offer night sleeping accommodations equal to the full day time seating capacity in their public carriers. This novel cooperative functioning of the novel berth elements with the novel hoisting apparatus also is the combination which enables the vehicle driver to make up and unmake the berths therein conveniently by mechanical means.

It is not pretended that the vehicles with berths of the present combinations will take the place of the pretentious compartment vehicles now in operation. The present forms are introduced as an improvement to replace the vehicles in which at present passengers are obliged to sleep in sitting positions in chairs tilting back in a partial manner. The sleeping quarters of this invention are just as close as in the vehicles with tilting chairs proposed to replace, but they are more comfortable in that they allow a passenger room to recline in a full sleeping position.

Buses stop at frequent intervals on the road to allow passengers periods for refreshment or intervals of rest at stations. The berths can be made up or unmade by bus attendants at convenient stops evening or mornings. These stops can be at stations provided with dressing rooms for passengers who might desire to change from day to night clothes and vice versa, and also where bus attendants may pick up or leave such accessories as the passengers who sleep in night clothes may wish to use during night travel.

The vehicles may, of course, be divided into sections—a section for male and a section for female passengers. Or the lower tiers may be reserved for one and the upper tiers for the other class of passengers.

The present invention as it can readily be seen, is susceptible to various modifications and expansion in different directions. The details herein shown are for purposes of disclosure and not as limitations. The right, therefore, is hereby reserved to make such variations or changes as properly fall within the scope of this specification or the accompanying drawings made a part of the present application.

I claim:

1. In a vehicle interior of the class described, the combination with a plurality of spaced chairs having seats and backs arranged in line and facing in the same direction, of means for incorporating the same into multi-decked sleeping quarters, including a plurality of guide posts in connection therewith, odd numbered chairs in said line having auxiliary supporting cushions in spaced relation to their seats, even numbered chairs in said line having cushions hingedly supported beneath the seats for rotation into supported alignment therewith, the back of each of said chairs being pivotally mounted for rotation into substantially horizontal alignment with its respective seat, the odd numbered chairs being vertically movable to align the auxiliary supporting cushions with the backs of the even numbered chairs when the latter are rotated to a substantially horizontal position, and platform slideably mounted on said guide posts above even numbered chairs for vertical movement into horizontal alignment with the seats of said odd numbered chairs.

2. In a vehicle interior of the class described, the combination with at least one pair of spaced chairs having seats and hinged backs arranged in line and facing in the same direction, of means for converting said chairs into multi-deck sleeping quarters, including guide posts vertically positioned at the corners of each of said chairs, the first chair having an auxiliary cushion spaced beneath its seat, the second chair having a cushion hingedly mounted beneath its seat for forward rotation into supported horizontal alignment with said seat, the back of each of said chairs being rotatable into substantially horizontal alignment with its seat, the first chair being slidably mounted to its guide posts for vertical movement to align its auxiliary cushion with the back of the second chair when said back is in horizontal position, and platforms normally mounted on the guide posts of the second chair and above it and slidable on said posts into horizontal alignment adjacent the seat of the first chair when the latter is elevated.

3. In a vehicle interior of the type described the combination with pairs of spaced chairs having seats and hinged backs, arranged in line and facing in the same direction, of means for incorporating said chairs into multi-deck sleeping quarters, including guide posts vertically fixed at each of said chairs, one chair of each of said pairs of chairs having an auxiliary cushion spaced beneath its seat, the other chair of each of said pairs of chairs having a cushion hingedly mounted beneath its seat for rotation into supported horizontal alignment with said seat, the back of each of said chairs being rotatable into substantially horizontal alignment with its seat, one of each of said pairs of chairs being slidably mounted upon its respective guide posts for vertical movement of said chair to align the spaced auxiliary cushion thereof with the seat of the other chair of said pair, and platforms slidably mounted on the guide posts above the chair having a cushion hingedly mounted beneath its seat for alignment with the seat of the other chair of that pair.

4. In a vehicle interior of the typ described the combination with pairs of spaced chairs having seats and hinged backs, said chairs arranged in line and facing in the same direction, of means for incorporating said chairs into multi-deck sleeping quarters, including guide posts vertically arranged at the corners of each of said chairs, one chair of each of said pairs of chairs having an auxiliary cushion spaced beneath its seat, the other chair of each of said pairs of chairs having a cushion hingedly mounted beneath its seat for forward rotation into supported horizontal alignment with its seat, the back of each of said chairs being rotatable about its hinge into substantially horizontal alignment with its seat, each of the chairs having a cushion hingedly mounted therebeneath being slidable on its guide posts to a position where its seat is in alignment with the auxiliary cushion of the other chair of its pair, and platforms slidably mounted on said last named guide posts for alignment with the seat of the last named chair.

5. In a vehicle interior of the type described, the combination with pairs of spaced chairs having seats and hinged backs, said chairs arranged in line and facing in the same direction, of means for incorporating said chairs into multi-deck sleeping quarters, including guide posts vertically fixed at the corners of said chairs, one chair of each of said pairs of chairs having an auxiliary cushion spaced beneath its seat, the back of each of said chairs being rotatable about its hinge into substantially horizontal alignment with its seat, the other chair of each of said pairs of chairs having its seat slidably mounted on the guide posts of its chair for alignment with the auxiliary cushion of the other of its pair of chairs, and a platform mounted on the last named guide posts for alignment with the seat of the last named chair.

6. In a vehicle interior of the type described, having a plurality of spaced chairs in line and facing in the same direction, and having seats in said chairs with backs hinged relatively thereto for horizontal positioning, means for converting said chairs into multi-deck sleeping quarters including an auxiliary cushion mounted beneath each seat of alternate chairs, and spaced therefrom, at least one chair of every pair of such plurality of chairs being mounted for vertical movement to align said auxiliary cushions with the seats and horizontally positioned backs of other alternate chairs, and platforms slidably mounted on said vehicle interior for alignment with the seats of alternate chairs having the spaced auxiliary cushions therebelow.

7. The combination as set forth in claim 3 wherein the guide posts are hollowed interiorly and hoisting means including cables are connected to said slidably mounted elements, said cables being operatively mounted within said guide posts.

8. The combination as set forth in claim 3 wherein the guide posts are hollowed upon the interior, hoisting means for raising or lowering the slidably mounted chairs and platforms operating in part through said hollow posts, and operating means in connection with said hoisting means for raising and lowering the slidably mounted chairs and platforms simultaneously.

9. The combination as set forth in claim 3 wherein the guide posts are hollowed upon the interior, hoisting means, for raising or lowering the slidably mounted chairs and platforms, in part concealed within the said hollow posts and in part concealed within interwall spaces within the said vehicle, and operating means in connection with said hoisting means for raising and lowering the slidably mounted chairs and platforms simultaneously.

10. In a vehicle interior of the kind described, the combination with articulating platforms and hinge-backed chairs of means for incorporating said platforms and said chairs, with backs turned to horizontal positions, into multi-deck sleeping quarters, said platforms and said chairs separately disposed when not incorporated in said sleeping quarters.

S. J. STANTON.